United States Patent
Lin et al.

(10) Patent No.: US 12,494,258 B2
(45) Date of Patent: Dec. 9, 2025

(54) THREE-DIMENSIONAL MEMORY ARRAY, MEMORY SEARCHING ENGINE CIRCUIT AND ENCODING METHOD OF THE SAME

(71) Applicant: MACRONIX INTERNATIONAL CO., LTD., Hsinchu (TW)

(72) Inventors: Yu-Hsuan Lin, Taichung (TW); Po-Hao Tseng, Taichung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 212 days.

(21) Appl. No.: 18/435,089

(22) Filed: Feb. 7, 2024

(65) Prior Publication Data

US 2025/0253001 A1    Aug. 7, 2025

(51) Int. Cl.
*G11C 16/26* (2006.01)
*G11C 16/08* (2006.01)
*G11C 16/34* (2006.01)

(52) U.S. Cl.
CPC .............. *G11C 16/26* (2013.01); *G11C 16/08* (2013.01); *G11C 16/3404* (2013.01)

(58) Field of Classification Search
CPC ................................................ G11C 11/5642
See application file for complete search history.

(56) References Cited

U.S. PATENT DOCUMENTS

| 8,169,808 | B2 | 5/2012 | Roohparvar |
| 9,330,779 | B2 | 5/2016 | Mui |
| 10,127,150 | B2 | 11/2018 | Sprouse |
| 2016/0118135 | A1* | 4/2016 | Dutta .................. G11C 11/5642 365/185.03 |
| 2016/0172037 | A1 | 6/2016 | Lee |
| 2022/0068386 | A1 | 3/2022 | Tseng et al. |
| 2023/0420047 | A1 | 12/2023 | Tseng et al. |

FOREIGN PATENT DOCUMENTS

TW         I793854 B    2/2023

* cited by examiner

*Primary Examiner* — Jason Lappas
(74) *Attorney, Agent, or Firm* — McClure, Qualey & Rodack, LLP

(57) ABSTRACT

A three-dimensional memory array comprising a plurality of NAND strings. Each NAND string is configured to store a storage data having multiple bits and receive a searching input having multiple bits. Each bit of the storage data and the searching input is of a bit value "0", a bit value "1", a wildcard bit or an invalid bit. At least one bit of the storage data is configured as data bit(s), at least bit of the searching input is configured as search bit(s). All of the data bit(s) and the search bit(s) are of bit value "0" or bit value "1". When the position of the data bit(s) in the storage data overlaps with the position of the search bit(s) in the searching input, the NAND string that stores the storage data is turned off; otherwise, the NAND string that stores the storage data generates an output current.

20 Claims, 11 Drawing Sheets

| DATA1[1] | | |
|---|---|---|
| bit value "0" | bit value "1" | wildcard bit | invalid bit |
| T1_1(TL)<br>T1_2(TH) | T1_1(TH)<br>T1_2(TL) | T1_1(TH)<br>T1_2(TH) | T1_1(TL)<br>T1_2(TL) |

Fig. 3A

| IN[1] | | |
|---|---|---|
| bit value "0" | bit value "1" | wildcard bit | invalid bit |
| WL1_0(VDH)<br>WL2_0(VDL) | WL1_0(VDL)<br>WH2_0(VDH) | WL1_0(VDL)<br>WL2_0(VDH) | WL1_0(VDH)<br>WL2_0(VDH) |

Fig. 3B

| IN | vOvv_vvvv_vvvv_vvvv_vvvv_vvvv_vvvv_vvvv |
|---|---|
| DATA1 | 0111_1111_1111_1111_1111_1111_1111_1111 | Mismatch (Turn on)
| DATA2 | 1011_1111_1111_1111_1111_1111_1111_1111 | Match (Turn off)
| DATA3 | 1101_1111_1111_1111_1111_1111_1111_1111 | Mismatch (Turn on)
| ... | ... |
| DATA30 | 1111_1111_1111_1111_1011_1111_1111_1111 | Mismatch (Turn on)
| ... | ... |
| DATA47 | 1111_1111_1111_1111_1111_1111_1111_1101 | Mismatch (Turn on)
| DATA48 | 1111_1111_1111_1111_1111_1111_1111_1110 | Mismatch (Turn on)

Fig. 4A

| | |
|---|---|
| IN | 1011_1111_1111_1111_1111_1111_1111_1111 |
| DATA1 | 0vvv_vvvv_vvvv_vvvv_vvvv_vvvv_vvvv_vvvv | Mismatch (Turn on)
| DATA2 | v0vv_vvvv_vvvv_vvvv_vvvv_vvvv_vvvv_vvvv | Match (Turn off)
| DATA3 | vv0v_vvvv_vvvv_vvvv_vvvv_vvvv_vvvv_vvvv | Mismatch (Turn on)
| ... | ... |
| DATA30 | vvvv_vvvv_vvvv_vvvv_v0vv_vvvv_vvvv_vvvv | Mismatch (Turn on)
| ... | ... |
| DATA47 | vvvv_vvvv_vvvv_vvvv_vvvv_vvvv_vvvv_vv0v | Mismatch (Turn on)
| DATA48 | vvvv_vvvv_vvvv_vvvv_vvvv_vvvv_vvvv_vvv0 | Mismatch (Turn on)

Fig. 4B

| | | |
|---|---|---|
| IN | 0000_vvvv_vvvv_vvvv_vvvv_vvvv_vvvv_vvvv_vvvv | |
| DATA1 | 0111_1111_1111_1111_1111_1111_1111_1111 | Match (Turn off) |
| DATA2 | 1011_1111_1111_1111_1111_1111_1111_1111 | Match (Turn off) |
| DATA3 | 1101_1111_1111_1111_1111_1111_1111_1111 | Match (Turn off) |
| DATA4 | 1110_1111_1111_1111_1111_1111_1111_1111 | Match (Turn off) |
| ... | ... | |
| DATA30 | 1111_1111_1111_1111_1011_1111_1111_1111 | Mismatch (Turn on) |
| ... | ... | |
| DATA47 | 1111_1111_1111_1111_1111_1111_1111_1101 | Mismatch (Turn on) |
| DATA48 | 1111_1111_1111_1111_1111_1111_1111_1110 | Mismatch (Turn on) |

Fig. 4C

| IN | 0000_1111_1111_1111_1111_1111_1111_1111_1111 | |
|---|---|---|
| DATA1 | 0vvv_vvvv_vvvv_vvvv_vvvv_vvvv_vvvv_vvvv | Match (Turn off) |
| DATA2 | v0vv_vvvv_vvvv_vvvv_vvvv_vvvv_vvvv_vvvv | Match (Turn off) |
| DATA3 | vv0v_vvvv_vvvv_vvvv_vvvv_vvvv_vvvv_vvvv | Match (Turn off) |
| DATA4 | vvv0_vvvv_vvvv_vvvv_vvvv_vvvv_vvvv_vvvv | Match (Turn off) |
| ... | ... | |
| DATA30 | vvvv_vvvv_vvvv_vvvv_v0vv_vvvv_vvvv_vvvv | Mismatch (Turn on) |
| ... | ... | |
| DATA47 | vvvv_vvvv_vvvv_vvvv_vvvv_vvvv_vvvv_vv0v | Mismatch (Turn on) |
| DATA48 | vvvv_vvvv_vvvv_vvvv_vvvv_vvvv_vvvv_vvv0 | Mismatch (Turn on) |

Fig. 4D

| IN | v0vv_vvvv_vvvv_vvvv_vvvv_vvvv_vvvv_vvvv | |
|---|---|---|
| DATA1 | 0001_1111_1111_1111_1111_1111_1111_1111 | Match (Turn off) |
| DATA2 | 0000_1111_1111_1111_1111_1111_1111_1111 | Match (Turn off) |
| DATA3 | 0000_0111_1111_1111_1111_1111_1111_1111 | Match (Turn off) |
| DATA4 | 1000_0011_1111_1111_1111_1111_1111_1111 | Match (Turn off) |
| DATA5 | 1100_0001_1111_1111_1111_1111_1111_1111 | Mismatch (Turn on) |
| ... | ... | |
| DATA30 | 1111_1111_1111_1111_1111_1110_0000_1111 | Mismatch (Turn on) |
| ... | ... | |
| DATA47 | 1111_1111_1111_1111_1111_1111_1111_0000 | Mismatch (Turn on) |
| DATA48 | 1111_1111_1111_1111_1111_1111_1111_1000 | Mismatch (Turn on) |

Fig. 4E

| IN | 1011_1111_1111_1111_1111_1111_1111_1111 | |
|---|---|---|
| DATA1 | 000v_vvvv_vvvv_vvvv_vvvv_vvvv_vvvv_vvvv | Match (Turn off) |
| DATA2 | 0000_vvvv_vvvv_vvvv_vvvv_vvvv_vvvv_vvvv | Match (Turn off) |
| DATA3 | 0000_0vvv_vvvv_vvvv_vvvv_vvvv_vvvv_vvvv | Match (Turn off) |
| DATA4 | v000_00vv_vvvv_vvvv_vvvv_vvvv_vvvv_vvvv | Match (Turn off) |
| DATA5 | vv00_000v_vvvv_vvvv_vvvv_vvvv_vvvv_vvvv | Mismatch (Turn on) |
| ... | ... | |
| DATA30 | vvvv_vvvv_vvvv_vvvv_vvvv_vvv0_0000_vvvv | Mismatch (Turn on) |
| ... | ... | |
| DATA47 | vvvv_vvvv_vvvv_vvvv_vvvv_vvvv_vvvv_0000 | Mismatch (Turn on) |
| DATA48 | vvvv_vvvv_vvvv_vvvv_vvvv_vvvv_vvvv_v000 | Mismatch (Turn on) |

Fig. 4F

THREE-DIMENSIONAL MEMORY ARRAY, MEMORY SEARCHING ENGINE CIRCUIT AND ENCODING METHOD OF THE SAME

BACKGROUND

Technical Field

The present disclosure relates to encoding technologies. More particularly, the present disclosure relates to a three-dimensional memory array, a memory searching engine circuit and an encoding method of the same that encode a storage data and a searching input with specific rules.

Description of Related Art

With the development of flash memory technology, three-dimensional (3D) flash memory has gradually replaced traditional planar flash memory due to its lower unit cost. In addition, since big data and artificial intelligence technology require a large amount of calculations, data searching and data comparing functions have become important functions in 3D flash memory.

In present in-memory-searching (IMS) technologies, the searching result is determined by judging the output current intensity of an NAND string. However, determining the searching result according to the output current intensity may lead to inconsistencies in the judgment criteria of different memory searching engine circuits. In addition, the output current intensity of the memory searching engine circuit may vary after a long-term use, resulting in inaccurate searching results. Consequently, how to enhance the searching accuracy of memory searching engines is one of the topics in this field.

SUMMARY

A three-dimensional (3D) memory array comprising a plurality of NOT-AND (NAND) strings is provided in the present disclosure. Each of the plurality of NAND strings is configured to store a storage data having a plurality of bits and receive a searching input having a plurality of bits. Each of the plurality of bits of the storage data and the plurality of bits of the searching input is of a bit value "0", a bit value "1", a wildcard bit or an invalid bit. At least one of the plurality of bits of the storage data is configured as at least one data bit, at least one of the plurality of bits of the searching input is configured as at least one search bit, and all of the at least one data bit and the at least one search bit are of the bit value "0" or the bit value "1". When the position of the data bit in the storage data overlaps with the position of the search bit in the searching input, at least one of the plurality of NAND strings that stores the storage data is turned off. When the position of the data bit in the storage data does not overlap with the position of the search bit in the searching input, the at least one of the plurality of NAND strings that stores the storage data generates an output current.

In some embodiments of the 3D memory array, all of the at least one data bit and the at least one search bit are of the bit value "0". At least one other of the plurality of bits of the storage data that does not belong to the at least one data bit is of the bit value "1". At least one other of the plurality of bits of the searching input that does not belong to the at least one search bit is of the invalid bit.

In some embodiments of the 3D memory array, all of the at least one data bit and the at least one search bit are of the bit value "0". At least one other of the plurality of bits of the storage data that does not belong to the at least one data bit is of the invalid bit. At least one other of the plurality of bits of the searching input that does not belong to the at least one search bit is of the bit value "1".

In some embodiments of the 3D memory array, all of the at least one data bit and the at least one search bit are of the bit value "1". At least one other of the plurality of bits of the storage data that does not belong to the at least one data bit is of the bit value "0". At least one other of the plurality of bits of the searching input that does not belong to the at least one search bit is of the invalid bit.

In some embodiments of the 3D memory array, all of the at least one data bit and the at least one search bit are of the bit value "1". At least one other of the plurality of bits of the storage data that does not belong to the at least one data bit is of the invalid bit. At least one other of the plurality of bits of the searching input that does not belong to the at least one search bit is of the bit value "0".

In some embodiments of the 3D memory array, each of the plurality of NAND strings comprises a plurality of memory cells, and the plurality of memory cells are connected in series and respectively correspond to the plurality of bits of the storage data. Each of the plurality of memory cells comprises a first transistor and a second transistor connected in series along a current direction of the output current, and each of the first transistor and the second transistor has a first threshold voltage or a second threshold voltage, wherein the second threshold voltage is greater than the first threshold voltage. When the first transistor and the second transistor of one of the plurality of memory cells respectively have the first threshold voltage and the second threshold voltage, a corresponding bit corresponding to the one of the plurality of memory cells is of the bit value "0". When the first transistor and the second transistor of the one of the plurality of memory cells respectively have the second threshold voltage and the first threshold voltage, the corresponding bit corresponding to the one of the plurality of memory cells is of the bit value "1". When both the first transistor and the second transistor of the one of the plurality of memory cells have the second threshold voltage, the corresponding bit corresponding to the one of the plurality of memory cells is of the wildcard bit. When both the first transistor and the second transistor of the one of the plurality of memory cells have the first threshold voltage, the corresponding bit corresponding to the one of the plurality of memory cells is of the invalid bit.

In some embodiments of the 3D memory array, the first transistor and the second transistor are configured to respectively receive a first driving voltage and a second driving voltage from a plurality of word lines, wherein the first driving voltage and the second driving voltage correspond to one of the plurality of bits of the searching input. When the one of the plurality of bits of the searching input is of the bit value "0", the first driving voltage is greater than the second threshold voltage, and the second driving voltage is greater than the first threshold voltage and lower than the second threshold voltage. When the one of the plurality of bits of the searching input is of the bit value "1", the first driving voltage is greater than the first threshold voltage and lower than the second threshold voltage, and the second driving voltage is greater than the second threshold voltage. When the one of the plurality of bits of the searching input is of the wildcard bit, both the first driving voltage and the second driving voltage are greater than the first threshold voltage and lower than the second threshold voltage. When the one of the plurality of bits of the searching input is of the invalid bit, both the first driving voltage and the second driving voltage are greater than the second threshold voltage.

A memory searching engine circuit is provided in the present disclosure. The memory searching engine circuit comprises a 3D memory array, a plurality of word lines and a sensing circuit. The 3D memory array comprises a plurality of NAND strings, wherein each of the plurality of NAND strings is configured to store a storage data having a plurality of bits and receive a searching input having a plurality of bits. The plurality of word lines are coupled to the plurality of NAND strings of the 3D memory array, and are configured to transmit the searching input to the plurality of NAND strings. The sensing circuit is coupled to the 3D memory array, and is configured to generate a searching result when receiving an output current. Each of the plurality of bits of the storage data and the plurality of bits of the searching input is of a bit value "0", a bit value "1", a wildcard bit or an invalid bit. At least one of the plurality of bits of the storage data is configured as at least one data bit, at least one of the plurality of bits of the searching input is configured as at least one search bit, and all of the at least one data bit and the at least one search bit are of the bit value "0" or the bit value "1". When the position of the at least one data bit in the storage data overlaps with the position of the at least one search bit in the searching input, at least one of the plurality of NAND strings that stores the storage data is turned off. When the position of the at least one data bit in the storage data does not overlap with the position of the at least one search bit in the searching input, the at least one of the plurality of NAND strings that stores the storage data generates the output current.

In some embodiments of the memory searching engine circuit, at least consecutive two of the plurality of bits of the storage data are configured as at least two data bit, or at least consecutive two of the plurality of bits of the searching input are configured as at least two search bit.

In some embodiments of the memory searching engine circuit, all of the at least one data bit and the at least one search bit are of the bit value "0". At least one other of the plurality of bits of the storage data that does not belong to the at least one data bit is of the bit value "1". At least one other of the plurality of bits of the searching input that does not belong to the at least one search bit is of the invalid bit.

In some embodiments of the memory searching engine circuit, all of the at least one data bit and the at least one search bit are of the bit value "0". At least one other of the plurality of bits of the storage data that does not belong to the at least one data bit is of the invalid bit. At least one other of the plurality of bits of the searching input that does not belong to the at least one search bit is of the bit value "1".

In some embodiments of the memory searching engine circuit, all of the at least one data bit and the at least one search bit are of the bit value "1". At least one other of the plurality of bits of the storage data that does not belong to the at least one data bit is of the bit value "0". At least one other of the plurality of bits of the searching input that does not belong to the at least one search bit is of the invalid bit.

In some embodiments of the memory searching engine circuit, all of the at least one data bit and the at least one search bit are of the bit value "1". At least one other of the plurality of bits of the storage data that does not belong to the at least one data bit is of the invalid bit. At least one other of the plurality of bits of the searching input that does not belong to the at least one search bit is of the bit value "0".

In some embodiments of the memory searching engine circuit, each of the plurality of NAND strings comprises a plurality of memory cells, and the plurality of memory cells are connected in series and respectively correspond to the plurality of bits of the storage data. Each of the plurality of memory cells comprises a first transistor and a second transistor connected in series along a current direction of the output current, and each of the first transistor and the second transistor has a first threshold voltage or a second threshold voltage, wherein the second threshold voltage is greater than the first threshold voltage. When the first transistor and the second transistor of one of the plurality of memory cells respectively have the first threshold voltage and the second threshold voltage, a corresponding bit corresponding to the one of the plurality of memory cells is of the bit value "0". When the first transistor and the second transistor of the one of the plurality of memory cells respectively have the second threshold voltage and the first threshold voltage, the corresponding bit corresponding to the one of the plurality of memory cells is of the bit value "1". When both the first transistor and the second transistor of the one of the plurality of memory cells have the second threshold voltage, the corresponding bit corresponding to the one of the plurality of memory cells is of the wildcard bit. When both the first transistor and the second transistor of the one of the plurality of memory cells have the first threshold voltage, the corresponding bit corresponding to the one of the plurality of memory cells is of the invalid bit.

In some embodiments of the memory searching engine circuit, the first transistor and the second transistor are configured to respectively receive a first driving voltage and a second driving voltage from the plurality of word lines, wherein the first driving voltage and the second driving voltage correspond to one of the plurality of bits of the searching input. When the one of the plurality of bits of the searching input is of the bit value "0", the first driving voltage is greater than the second threshold voltage, and the second driving voltage is greater than the first threshold voltage and lower than the second threshold voltage. When the one of the plurality of bits of the searching input is of the bit value "1", the first driving voltage is greater than the first threshold voltage and lower than the second threshold voltage, and the second driving voltage is greater than the second threshold voltage. When the one of the plurality of bits of the searching input is of the wildcard bit, both the first driving voltage and the second driving voltage are greater than the first threshold voltage and lower than the second threshold voltage. When the one of the plurality of bits of the searching input is of the invalid bit, both the first driving voltage and the second driving voltage are greater than the second threshold voltage.

An encoding method suitable for a memory searching engine circuit is provided in the present disclosure. The memory searching engine circuit comprises a plurality of NAND strings, the plurality of NAND strings is configured to receive a searching input having a plurality of bits. The encoding method comprises: storing, by each of the plurality of NAND strings, a storage data having a plurality of bits, wherein at least one of the plurality of bits of the storage data is configured as at least one data bit; and configuring, by the memory searching engine circuit, the plurality of bits of the searching input, wherein at least one of the plurality of bits of the searching input is configured as at least one search bit. Each of the plurality of bits of the storage data and the plurality of bits of the searching input is of a bit value "0", a bit value "1", a wildcard bit or an invalid bit. In response to the position of the at least one data bit in the storage data overlapping with the position of the at least one search bit in the searching input, at least one of the plurality of NAND strings that stores the storage data is turned off. In response to the position of the at least one data bit in the storage data not overlapping with the position of the at least one search bit in the searching input, the at least one of the plurality of NAND strings that stores the storage data generates an output current.

In some embodiments of the encoding method, storing, by each of the plurality of NAND strings, the storage data having the plurality of bits comprises: configuring the at least one data bit as the bit value "0"; and configuring at least one other of the plurality of bits of the storage data that does not belong to the at least one data bit as the invalid bit. Configuring, by the memory searching engine circuit, the plurality of bits of the searching input comprises: configuring the at least one search bit as the bit value "0"; and configuring at least one other of the plurality of bits of the searching input that does not belong to the at least one search bit as the bit value "1".

In some embodiments of the encoding method, storing, by each of the plurality of NAND strings, the storage data having the plurality of bits comprises: configuring the at least one data bit as the bit value "0"; and configuring at least one other of the plurality of bits of the storage data that does not belong to the at least one data bit as the bit value "1". Configuring, by the memory searching engine circuit, the plurality of bits of the searching input comprises: configuring the at least one search bit as the bit value "0"; and configuring at least one other of the plurality of bits of the searching input that does not belong to the at least one search bit as the invalid bit.

In some embodiments of the encoding method, storing, by each of the plurality of NAND strings, the storage data having the plurality of bits comprises: configuring the at least one data bit as the bit value "1"; and configuring at least one other of the plurality of bits of the storage data that does not belong to the at least one data bit as the invalid bit. Configuring, by the memory searching engine circuit, the plurality of bits of the searching input comprises: configuring the at least one search bit as the bit value "1"; and configuring at least one other of the plurality of bits of the searching input that does not belong to the at least one search bit as the bit value "0".

In some embodiments of the encoding method, storing, by each of the plurality of NAND strings, the storage data having the plurality of bits comprises: configuring the at least one data bit as the bit value "1"; and configuring at least one other of the plurality of bits of the storage data that does not belong to the at least one data bit as the bit value "0". Configuring, by the memory searching engine circuit, the plurality of bits of the searching input comprises: configuring the at least one search bit as the bit value "1"; and configuring at least one other of the plurality of bits of the searching input that does not belong to the at least one search bit as the invalid bit.

With the 3D memory array, memory searching engine circuit and encoding method of the same of the present disclosure, the result of in-memory-searching can be determined according to the on or off of the NAND string, so as to prevent inaccurate judgments of in-memory-searching due to errors in conduction current.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

FIG. 3A is a schematic diagram of the configuration of a memory cell corresponding to various storage data in accordance with some embodiments of the present disclosure.

FIG. 3B is a schematic diagram of the configuration of the voltage of a word line corresponding to various searching input in accordance with some embodiments of the present disclosure.

FIG. 4A is a schematic diagram of the matching conditions between the storage data and the searching input in accordance with some embodiments of the present disclosure.

FIG. 4B is a schematic diagram of the matching conditions between the storage data and the searching input in accordance with some embodiments of the present disclosure.

FIG. 4C is a schematic diagram of the matching conditions between the storage data and the searching input in accordance with some embodiments of the present disclosure.

FIG. 4D is a schematic diagram of the matching conditions between the storage data and the searching input in accordance with some embodiments of the present disclosure.

FIG. 4E is a schematic diagram of the matching conditions between the storage data and the searching input in accordance with some embodiments of the present disclosure.

FIG. 4F is a schematic diagram of the matching conditions between the storage data and the searching input in accordance with some embodiments of the present disclosure.

DETAILED DESCRIPTION

Reference will now be made in detail to the present embodiments of the disclosure, examples of which are illustrated in the accompanying drawings.

In the present disclosure, when an element is referred to as "connected", it may mean "electrically connected" or "optical connected". When an element is referred to as "coupled", it may mean "electrically coupled" or "optical coupled". "Connected" or "coupled" can also be used to indicate that two or more components operate or interact with each other. As used in the present disclosure, the singular forms "a", "one" and "the" are also intended to include plural forms, unless the context clearly indicates otherwise. It will be further understood that when used in this specification, the terms "comprises (comprising)" and/or "includes (including)" designate the existence of stated features, steps, operations, elements and/or components, but the existence or addition of one or more other features, steps, operations, elements, components, and/or groups thereof are not excluded.

Figure 1:
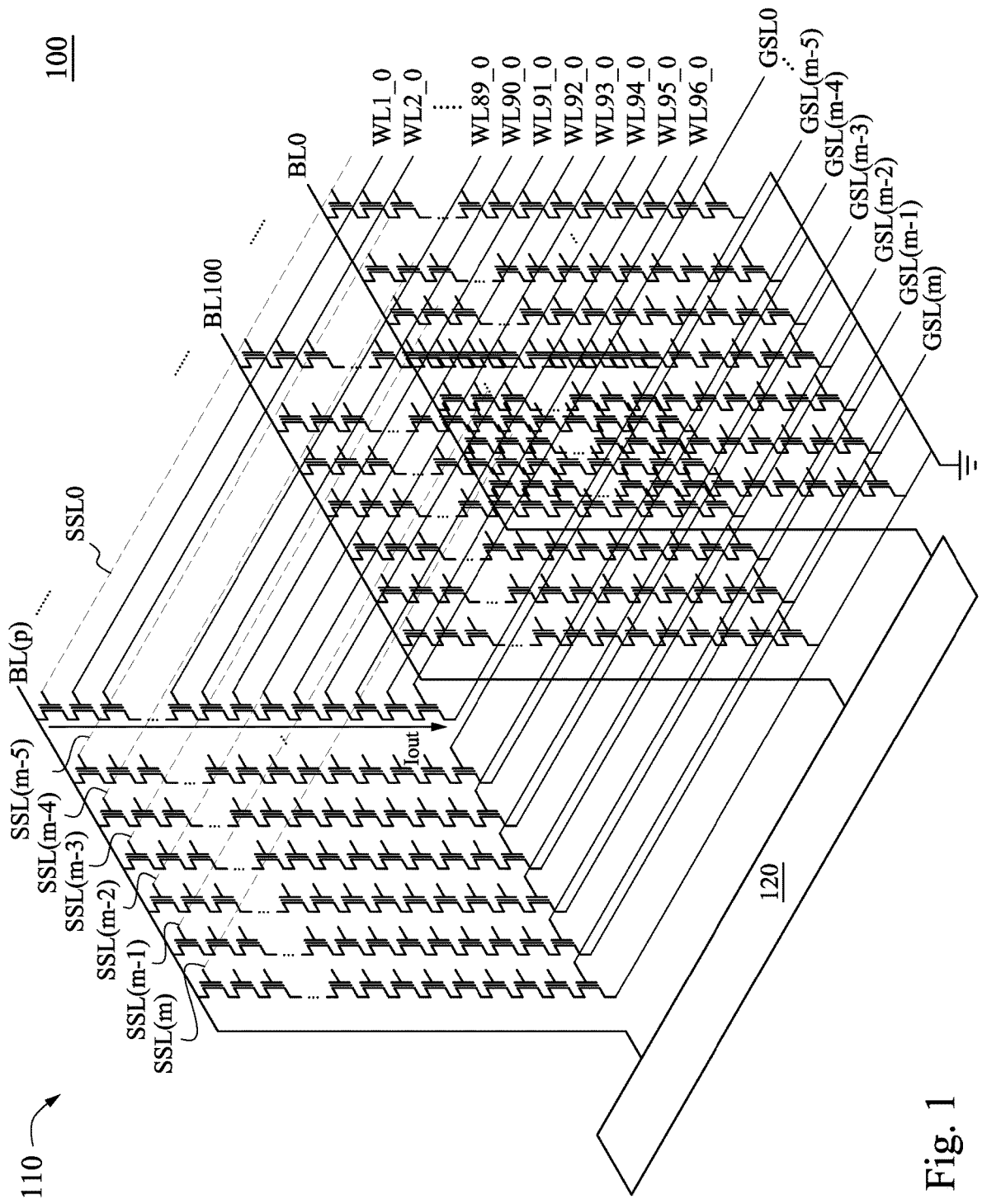
FIG. 1 is a schematic diagram of a memory searching engine circuit in accordance with some embodiments of the present disclosure.

FIG. 1 is a schematic diagram of a memory searching engine circuit 100 in accordance with some embodiments of the present disclosure. In some embodiments, the memory searching engine circuit 100 comprises a three-dimensional (3D) memory array 110, a sensing circuit 120, bit lines BL0-BL(p) and a plurality of word lines (for the sake of brevity of figure, only word lines WL1_0-WL96_0 are labeled), wherein p is a positive integer.

The 3D memory array 110 is coupled to the sensing circuit 120, and is configured to store a plurality of storage data DATA and be turned on or turned off according to a received searching input IN. In some embodiments, the 3D memory array 110 comprises a plurality of NOT-AND (NAND) strings (not labeled for the sake of brevity in FIG. 1, which will be described in subsequent paragraphs and figures). In some embodiments, as shown in FIG. 1, the bit lines BL0-BL(p) extend along a first direction (e.g., direction X), the plurality of word lines extend along a second direction (e.g., direction Y), and the plurality of NAND strings extend along a third direction (e.g., direction Z). Therefore, the bit lines BL0-BL(p), the plurality of word lines and the plurality of NAND strings form a 3D structure.

The bit lines BL0-BL(p) are connected to the sensing circuit 120, and are configured to generate an output current Iout when a NAND string is turned on. Each of the word lines is connected to multiple NAND strings, and is configured to control the conduction status of these NAND strings based on the searching input IN. Each of the NAND strings is connected between one of the bit lines BL0-BL(p) and a ground line CSL, and is configured to be turned on or turned off according to its stored storage data DATA and received searching input IN.

Operationally, each of the NAND strings of the 3D memory array 110 respectively stores a storage data DATA and receives the searching input IN from the plurality of word lines. When the storage data DATA stored by a NAND string does not match the searching input IN, this NAND string will be turned on and generate the output current Iout. On the contrary, when the storage data DATA stored by a NAND string matches the searching input IN, this NAND string will be turned off, and thus will not generate the output current Iout.

Sensing circuit 120 is coupled to the 3D memory array 110, and configured to sense whether each NAND string generates the output current Iout, thereby generating a searching result. Specifically, when the sensing circuit 120 senses that a NAND string generates an output current Iout, it will determine that the storage data DATA of the NAND string matches the searching input IN, and generate a searching result corresponding to the NAND string.

Figure 2:
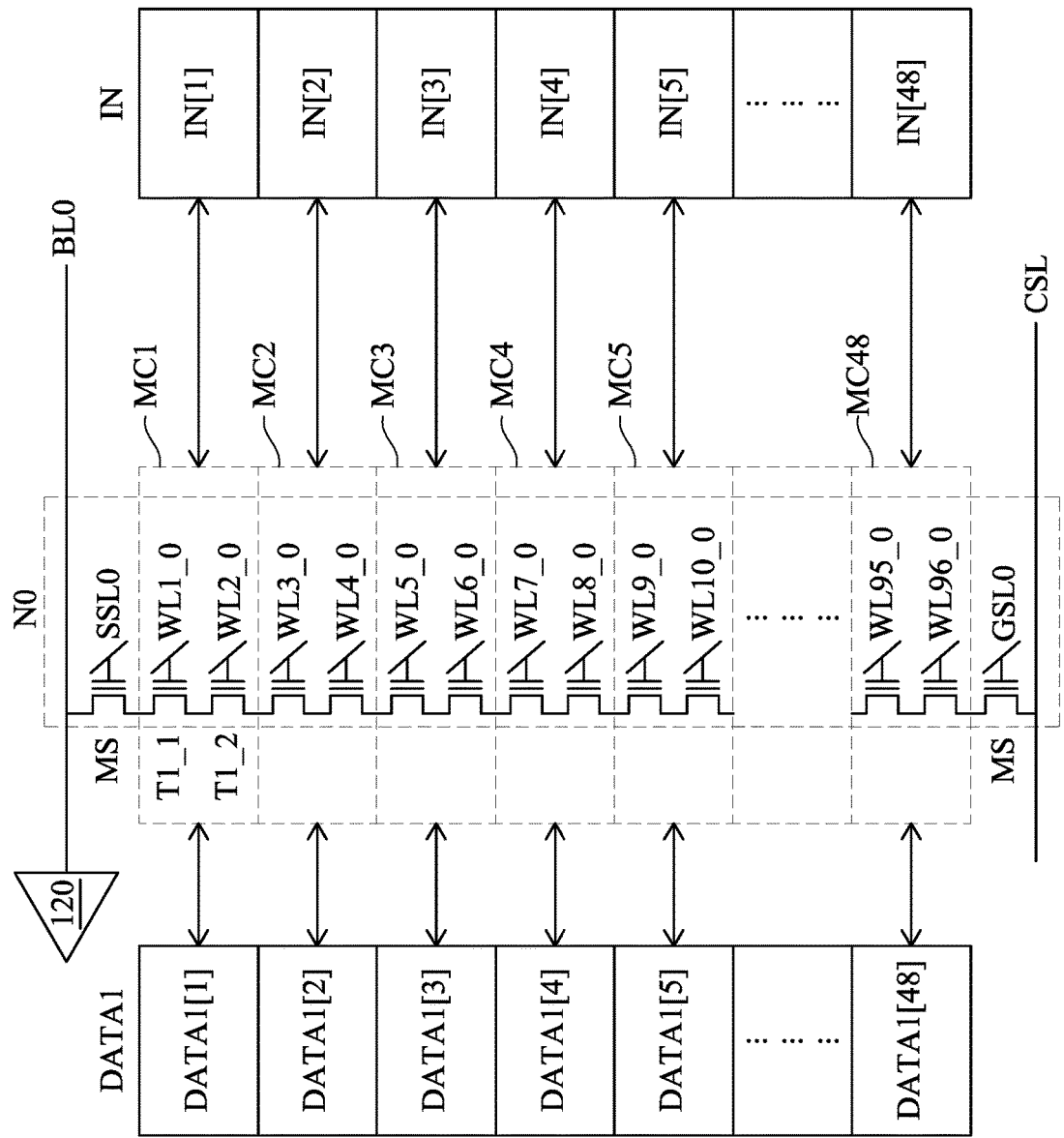
FIG. 2 is a schematic diagram of the correspondence between a NOT-AND (NAND) string, a storage data and a searching input in accordance with some embodiments of the present disclosure.

The correspondence between NAND strings, storage data and searching input is further shown in FIG. 2. FIG. 2 is a schematic diagram of the correspondence between the NAND string N0, storage data DATA1 and searching input IN in accordance with some embodiments of the present disclosure.

The NAND string N0 is coupled between the bit line BL0 and the ground line CSL. In some embodiments, the NAND string N0 comprises memory cells MC1-MC48 and two selection transistors MS connected in series with each other. The memory cells MC1-MC48 are configured to respectively store 48 bits of the storage data DATA1. For example, the memory cell MC1 is configured to store the first bit DATA1[1] of the storage data DATA1, and the memory cell MC2 is configured to store the second bit DATA1[2] of the storage data DATA1, and so on. The two selection transistors MS are respectively connected to the corresponding one of string selection lines SSL0-SSL(m) (e.g., the string selection line SSL0) and the corresponding one of ground selection lines GSL0-GSL(m) (e.g., the ground selection line GSL0), wherein m is a positive integer.

In some embodiments, each of the memory cells comprises two transistors connected in series with each other. Take the embodiment in FIG. 2 as an example, the memory cell M1 comprises a transistor T1_1 and a transistor T1_2, the memory cell M2 comprises a transistor T2_1 and a transistor T2_2, and so on. Based on the configuration of the two transistors in a memory cell, it can be determined that the memory cell (i.e., the corresponding bit of the storage data DATA1) is of a bit value "0", a bit value "1", a wildcard bit or an invalid bit.

Please refer to FIG. 3A. FIG. 3A is a schematic diagram of the configurations of the memory cell MC1 corresponding to various storage data DATA in accordance with some embodiments of the present disclosure. In some embodiments, each of the transistors in the memory cell MC1 can be implemented with a transistor TH or a transistor TL, wherein the transistor TH and the transistor TL respectively have a threshold voltage VTH and a threshold voltage VTL, and the threshold voltage VTH is greater than the threshold voltage VTL.

Operationally, when the control terminal of the transistor TH receives a voltage greater than the threshold voltage VTH, the transistor TH will be turned on; when the control terminal of the transistor TL receives a voltage greater than the threshold voltage VTL, the transistor TL will be turned on.

Take the transistor T1_1 and the transistor T1_2 in the memory cell MC1 as an example, when the transistor T1_1 and the transistor T1_2 are respectively implemented with the transistor TL and the transistor TH, the memory cell MC1 (and the corresponding bit DATA1[1]) is of the bit value "0"; when the transistor T1_1 and the transistor T1_2 are respectively implemented with the transistor TH and the transistor TL, the memory cell MC1 (and the corresponding bit DATA1[1]) is of the bit value "1"; when both of the transistor T1_1 and the transistor T1_2 are implemented with the transistor TL, the memory cell MC1 (and the corresponding bit DATA1[1]) is of the wildcard bit; when both of the transistor T1_1 and the transistor T1_2 are implemented with the transistor TH, the memory cell MC1 (and the corresponding bit DATA1[1]) is of the invalid bit.

Please refer to FIG. 2 again. The memory cells MC1-MC48 are configured to respectively receive 48 bits of the searching input IN from the word lines WL1_0-WL96_0. Specifically, the voltages provided from the word line WL1_0 and the word line WL2_0 correspond to the first bit IN[1] of the searching input IN, the voltages provided from the word line WL3_0 and the word line WL4_0 correspond to the second bit IN[2] of the searching input IN, and so on. Based on the configuration of the voltages of the two word lines, it can be determined that the corresponding bit of the searching input IN is of the bit value "0", the bit value "1", the wildcard bit or the invalid bit.

Please refer to FIG. 3B. FIG. 3B is a schematic diagram of the configurations of the voltages of the word lines WL1_0-WL2_0 corresponding to various searching input IN in accordance with some embodiments of the present disclosure. In some embodiments, each of the word lines WL1_0-WL2_0 has a driving voltage VDH or a driving voltage VDL, and the driving voltage VDH is greater than the driving voltage VDL.

Take the word line WL1_0 and the word line WL2_0 as an example, when the voltages provided by the word line WL1_0 and the word line WL2_0 are the driving voltage VDH and the driving voltage VDL respectively, the bit IN[1] of the searching input IN corresponding to the word line WL1_0 and the word line WL2_0 is of the bit value "0"; when the voltages provided by the word line WL1_0 and the word line WL2_0 are the driving voltage VDL and the driving voltage VDH respectively, the bit IN[1] of the searching input IN corresponding to the word line WL1_0 and the word line WL2_0 is of the bit value "1"; when both of the voltages provided by the word line WL1_0 and the word line WL2_0 are the driving voltage VDL, the bit IN[1] of the searching input IN corresponding to the word line WL1_0 and the word line WL2_0 is of the wildcard bit; when both of the voltages provided by the word line WL1_0 and the word line WL2_0 are the driving voltage VDH, the bit IN[1] of the searching input IN corresponding to the word line WL1_0 and the word line WL2_0 is of the invalid bit.

In some embodiments, the driving voltage VDL is greater than the threshold voltage VTL and lower than the threshold voltage VTH, and the driving voltage VDH is greater than the threshold voltage VTH. In other words, the driving voltage VDH can turn on the transistor with the threshold voltage VTH or the threshold voltage VTL, while the driving voltage VDL can only turn on the transistor with the threshold voltage VTL, but cannot turn on the transistor with the threshold voltage VTH.

Figure 3C:
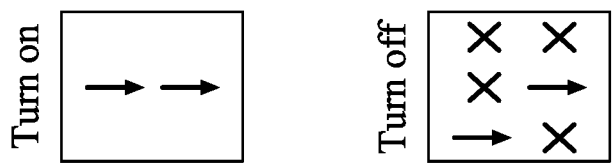
FIG. 3C is a schematic diagram of the conduction status of a memory cell under various conditions of storage data and searching input in accordance with some embodiments of the present disclosure.

FIG. 3C is a schematic diagram of the conduction status of a memory cell under various conditions of storage data DATA and searching input IN in accordance with some embodiments of the present disclosure. In FIG. 3C, the transistors marked with an arrow symbol represent turned-on transistors, while the transistors marked with a cross symbol represent turned-off transistors.

For example, when one of the bits of the storage data DATA is of the bit value "0", and the corresponding bit of the searching input IN is also of the bit value "0", the transistor with the threshold voltage VTL in the memory cell will receive the driving voltage VDH and thus be turned on, but another transistor with the threshold voltage VTH in the memory cell will receive the driving voltage VDL and thus be turned off, resulting in the memory cell being turned off. Vice versa, when one of the bits of the storage data DATA and the corresponding bit of the searching input IN both are of the bit value "1", the memory cell will also be turned off.

For another example, when one of the bits of the storage data DATA is of the bit value "0", and the corresponding bit of the searching input IN is of the bit value "1", the transistor with the threshold voltage VTL in the memory cell will receive the driving voltage VDL and thus be turned on, and another transistor with the threshold voltage VTH in the memory cell will receive the driving voltage VDH and thus also be turned on, resulting in the memory cell being turned on. Vice versa, when one of the bits of the storage data DATA is of the bit value "1", and the corresponding bit of the searching input IN is of the bit value "0", the memory cell will also be turned on.

In addition, when one of the bits of the storage data DATA or the corresponding bit of the searching input IN is of the invalid bit, the memory cell corresponding to this bit will be turned on; when one of the bits of the storage data DATA or the corresponding bit of the searching input IN is of the wildcard bit, the memory cell corresponding to this bit will be turned off.

Based on the aforementioned configurations between the bit and the threshold voltage/driving voltage, the storage data DATA and the searching input IN can be encoded in various ways. Please refer to FIGS. 4A-4F. FIGS. 4A-4F are schematic diagrams of the matching conditions between the storage data DATA and the searching input IN in accordance with various embodiments of the present disclosure.

In some embodiments, at least one of the bits of each of the storage data DATA1-DATA48 is configured as data bit(s), at least one of the bits of the searching input IN is configured as search bit(s), and both of the data bit(s) and the search bit(s) are of the bit value "0" or the bit value "1". When the position of the data bit(s) in the storage data DATA overlaps with the position of the search bit(s) in the searching input IN, the NAND string storing the storage data DATA will be turned off; when the position of the data bit(s) in the storage data DATA does not overlap with the position of the search bit(s) in the searching input IN, the NAND string storing the storage data DATA will generate the output current Iout.

Take the embodiment of FIG. 4A as an example, the second bit of the searching input IN is configured as the search bit and is of the bit value "0", and the other bits of the searching input IN are configured as the invalid bit (labeled with the letter "v"); the first bit of the storage data DATA1 is configured as the data bit and is of the bit value "0", the second bit of the storage data DATA2 is configured as the data bit and is of the bit value "0", the third bit of the storage data DATA3 is configured as the data bit and is of the bit value "0", and so on, and the other bits in the storage data DATA1-DATA48 that are not configured as the data bit are configured as the bit value "1". Therefore, in the embodiment of FIG. 4A, since the position of the data bit of the storage data DATA2 in the storage data DATA2 overlaps with the position of the search bit in the searching input IN (i.e., be located at the second bit), the NAND string storing the storage data DATA2 will be turned off, the other NAND strings will be turned on, and the sensing circuit 120 can then determine that the memory searching engine circuit 100 has successfully searched for the NAND string matching to the searching input IN.

The embodiment of FIG. 4B is similar to the embodiment of FIG. 4A, except that the other bits in the searching input IN that are not configured as the search bit are configured as the bit value "1", and the other bits in the storage data DATA1-DATA48 that are not configured as the data bit are configured as the invalid bit. The searching result of FIG. 4B is similar to which of FIG. 4A, and will not be repeated here.

In some embodiments, a plurality of consecutive bits in the searching input IN can also be configured as the search bits. Please refer to the embodiment of FIG. 4C, the first to fourth bits of the searching input IN are configured as the search bits and are of the bit value "0", and the other bits of the searching input IN are configured as the invalid bit; the first bit of the storage data DATA1 is configured as the data bit and is of the bit value "0", the second bit of the storage data DATA2 is configured as the data bit and is of the bit value "0", the third bit of the storage data DATA3 is configured as the data bit and is of the bit value "0", and so on, and the other bits in the storage data DATA1-DATA48 that are not configured as the data bit are configured as the bit value "1". Therefore, in the embodiment of FIG. 4C, since the positions of the data bit of the storage data DATA1-DATA4 in the storage data DATA1-DATA4 all overlap with the position of the search bits in the searching input IN (i.e., the four data bits of the four storage data all overlap with the search bits), the NAND strings storing the storage data DATA1-DATA4 will be turned off, the other NAND strings will be turned on, and the sensing circuit 120 can then determine that the memory searching engine circuit 100 has successfully searched for the NAND strings matching to the searching input IN.

The embodiment of FIG. 4D is similar to the embodiment of FIG. 4C, except that the other bits in the searching input IN that are not configured as the search bits are configured as the bit value "1", and the other bits in the storage data DATA1-DATA48 that are not configured as the data bit are configured as the invalid bit. The searching result of FIG. 4D is similar to which of FIG. 4C, and will not be repeated here.

In some embodiments, a plurality of consecutive bits in the storage data DATA1-DATA48 can also be configured as the data bits. Please refer to the embodiment of FIG. 4E, the second bit of the searching input IN is configured as the search bit and is of the bit value "0", and the other bits of the searching input IN are configured as the invalid bit; the first to third bits of the storage data DATA1 are configured as the data bits and are of the bit value "0", the first to fourth bits of the storage data DATA2 are configured as the data bits and are of the bit value "0", the first to fifth bits of the storage data DATA3 are configured as the data bits and are of the bit value "0", the second to sixth bits of the storage data DATA4 are configured as the data bits and are of the bit value "0", the third to seventh bits of the storage data DATA5 are configured as the data bits and are of the bit value "0", and so on, and the other bits in the storage data DATA1-DATA48 that are not configured as the data bits are configured as the bit value "1". Therefore, in the embodiment of FIG. 4E, since the positions of the data bits of the storage data DATA1-DATA4 in the storage data DATA1-DATA4 all overlap with the position of the search bit in the searching input IN (i.e., the four data bits of the four storage data all overlap with the search bit), the NAND strings storing the storage data DATA1-DATA4 will be turned off, the other NAND strings will be turned on, and the sensing circuit 120 can then determine that the memory searching engine circuit 100 has successfully searched for the NAND strings matching to the searching input IN.

The embodiment of FIG. 4F is similar to the embodiment of FIG. 4E, except that the other bits in the searching input IN that are not configured as the search bit are configured as the bit value "1", and the other bits in the storage data DATA1-DATA48 that are not configured as the data bits are configured as the invalid bit. The searching result of FIG. 4F is similar to which of FIG. 4E, and will not be repeated here.

It should be noted that the configuration of the bit value "0" and the bit value "1" in the embodiments of FIGS. 4A-4F can be exchanged. Take the embodiment in FIG. 4A as an example, the search bit in the searching input IN and the data bits in the storage data DATA1-DATA48 may be of the bit value "1", and the other bits in the storage data DATA1-DATA48 that are not configured as the data bit are configured as the bit value "0" (the bits in the searching input IN that were originally configured as the invalid bit will not be changed).

It should be noted that the numbers of word lines, bit lines, the numbers of memory cells in a single NAND string and the numbers of bits of storage data and searching input of the present disclosure are only examples, and are not intended to limit the present disclosure. Other numbers of word lines, bit lines, other numbers of memory cells in a single NAND string and other numbers of bits of storage data and searching input are within the scope of the present disclosure. In some embodiments, a single NAND string may comprises less than 48 memory cells, and both of the storage data and searching input may comprises less than 48 bits. In other embodiments, a single NAND string may comprises more than 48 memory cells, and both of the storage data and searching input may comprises more than 48 bits.

Figure 5:
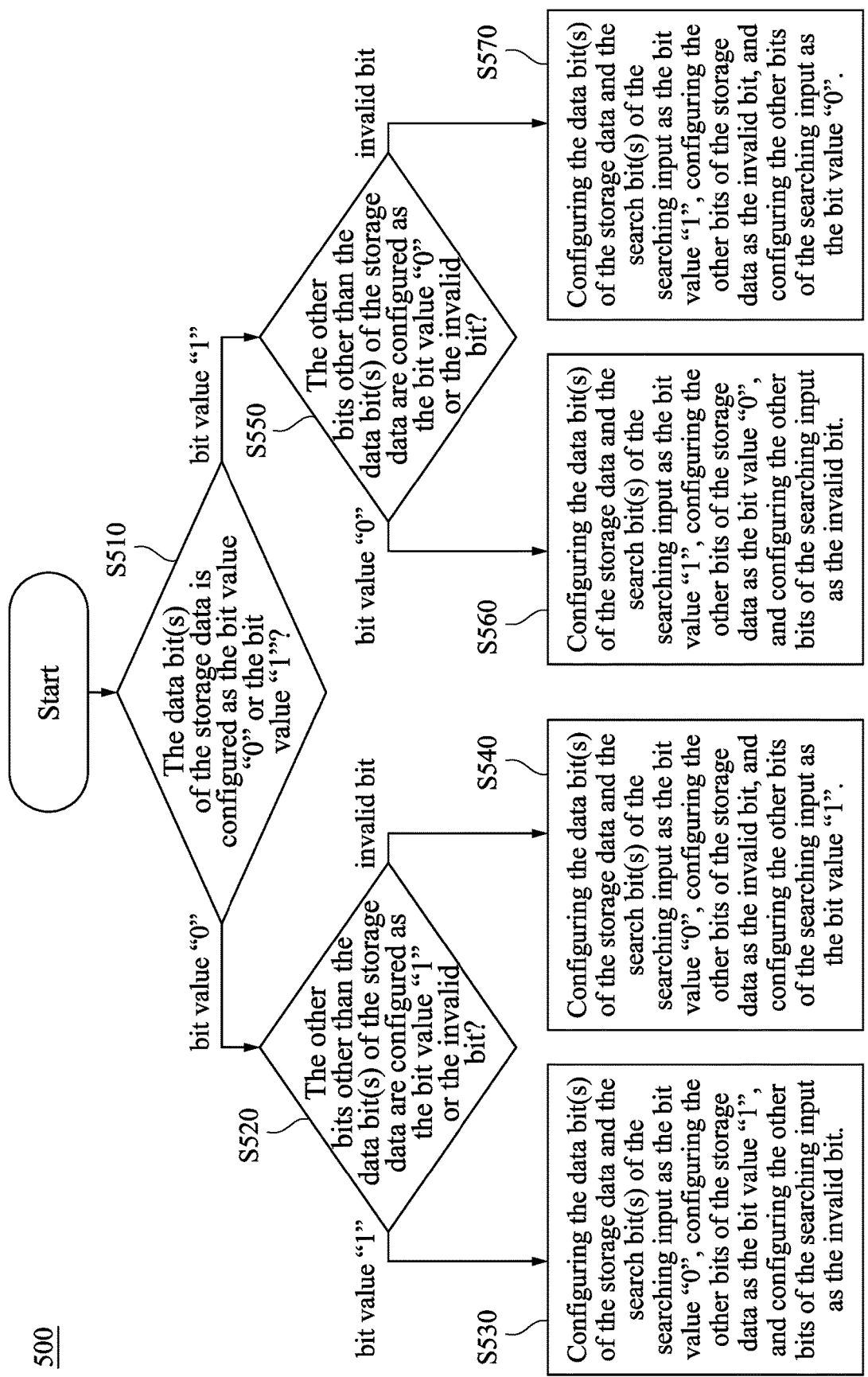
FIG. 5 is a flowchart of an encoding method of a memory searching engine circuit in accordance with some embodiments of the present disclosure.

FIG. 5 is a flowchart of an encoding method 500 of the memory searching engine circuit 100 in accordance with some embodiments of the present disclosure. In some embodiments, the encoding method 500 comprises steps S510, S520, S530, S540, S550, S560 and S570.

In step S510, the memory searching engine circuit 100 determines whether the data bit(s) of the storage data DATA is configured as the bit value "0" or the bit value "1". If the memory searching engine circuit 100 decides to configure the data bit(s) as the bit value "0", step S520 will be performed next; if the memory searching engine circuit 100 decides to configure the data bit(s) as the bit value "1", step S550 will be performed next.

In step S520, the memory searching engine circuit 100 determines whether the other bits other than the data bit(s) of the storage data DATA are configured as the bit value "1" or the invalid bit. If the memory searching engine circuit 100 decides to configure the other bits of the storage data DATA as the bit value "1", step S530 will be performed next; if the memory searching engine circuit 100 decides to configure the other bits of the storage data DATA as the invalid bit, step S540 will be performed next.

In step S530, the memory searching engine circuit 100 configures the data bit(s) of the storage data DATA as the bit value "0", configures the search bit(s) of the searching input IN as the bit value "0", configures the other bits of the storage data DATA as the bit value "1", and configures the other bits of the searching input IN as the invalid bit, so as to complete the encoding of the storage data DATA and the searching input IN.

In step S540, the memory searching engine circuit 100 configures the data bit(s) of the storage data DATA as the bit value "0", configures the search bit(s) of the searching input IN as the bit value "0", configures the other bits of the storage data DATA as the invalid bit, and configures the other bits of the searching input IN as the bit value "1", so as to complete the encoding of the storage data DATA and the searching input IN.

In step S550, the memory searching engine circuit 100 determines whether the other bits other than the data bit(s) of the storage data DATA are configured as the bit value "0" or the invalid bit. If the memory searching engine circuit 100 decides to configure the other bits of the storage data DATA as the bit value "0", step S560 will be performed next; if the memory searching engine circuit 100 decides to configure the other bits of the storage data DATA as the invalid bit, step S570 will be performed next.

In step S560, the memory searching engine circuit 100 configures the data bit(s) of the storage data DATA as the bit value "1", configures the search bit(s) of the searching input IN as the bit value "1", configures the other bits of the storage data DATA as the bit value "0", and configures the other bits of the searching input IN as the invalid bit, so as to complete the encoding of the storage data DATA and the searching input IN.

In step S570, the memory searching engine circuit 100 configures the data bit(s) of the storage data DATA as the bit value "1", configures the search bit(s) of the searching input IN as the bit value "1", configures the other bits of the storage data DATA as the invalid bit, and configures the other bits of the searching input IN as the bit value "0", so as to complete the encoding of the storage data DATA and the searching input IN.

It should be noted that the number and order of steps in the encoding method 500 in the present disclosure are only examples, and are not intended to limit the present disclosure Other numbers and orders of steps are within the scope of the present disclosure. In some embodiments, the encoding method 500 may further comprise step S580. Step S580 is performed after steps S530, S540, S560 and S570. In step S580, the memory searching engine circuit 100 resets the searching input IN.

With the memory searching engine circuit 100 and the encoding method 500 of the present disclosure, the searching results of the in-memory-searching can be determined by judging the conduction status of the NAND strings, instead of judging the current intensity, so as to avoid the problem of inaccurate judgment due to errors in current intensity, thereby improving the accuracy of judgment. In addition, the various embodiments of encoding method for the storage data DATA and searching input IN provided in the present disclosure also help to improve the flexibility in encoding.

The above are preferred embodiments of the present disclosure. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A three-dimensional (3D) memory array, comprising:
a plurality of NOT-AND (NAND) strings, wherein each of the plurality of NAND strings is configured to store a storage data having a plurality of bits and receive a searching input having a plurality of bits,
wherein each of the plurality of bits of the storage data and the plurality of bits of the searching input is of a bit value "0", a bit value "1", a wildcard bit or an invalid bit,
wherein at least one of the plurality of bits of the storage data is configured as at least one data bit, at least one of the plurality of bits of the searching input is configured as at least one search bit, and all of the at least one data bit and the at least one search bit are of the bit value "0" or the bit value "1",
when the position of the at least one data bit in the storage data overlaps with the position of the at least one search bit in the searching input, at least one of the plurality of NAND strings that stores the storage data is turned off, and
when the position of the at least one data bit in the storage data does not overlap with the position of the at least one search bit in the searching input, the at least one of the plurality of NAND strings that stores the storage data generates an output current.

2. The 3D memory array of claim 1, wherein all of the at least one data bit and the at least one search bit are of the bit value "0",
wherein at least one other of the plurality of bits of the storage data that does not belong to the at least one data bit is of the bit value "1", and
wherein at least one other of the plurality of bits of the searching input that does not belong to the at least one search bit is of the invalid bit.

3. The 3D memory array of claim 1, wherein all of the at least one data bit and the at least one search bit are of the bit value "0", wherein at least one other of the plurality of bits of the storage data that does not belong to the at least one data bit is of the invalid bit, and
wherein at least one other of the plurality of bits of the searching input that does not belong to the at least one search bit is of the bit value "1".

4. The 3D memory array of claim 1, wherein all of the at least one data bit and the at least one search bit are of the bit value "1",
wherein at least one other of the plurality of bits of the storage data that does not belong to the at least one data bit is of the bit value "0", and
wherein at least one other of the plurality of bits of the searching input that does not belong to the at least one search bit is of the invalid bit.

5. The 3D memory array of claim 1, wherein all of the at least one data bit and the at least one search bit are of the bit value "1",
wherein at least one other of the plurality of bits of the storage data that does not belong to the at least one data bit is of the invalid bit, and
wherein at least one other of the plurality of bits of the searching input that does not belong to the at least one search bit is of the bit value "0".

6. The 3D memory array of claim 1, wherein each of the plurality of NAND strings comprises a plurality of memory cells, and the plurality of memory cells are connected in series and respectively correspond to the plurality of bits of the storage data,
wherein each of the plurality of memory cells comprises a first transistor and a second transistor connected in series along a current direction of the output current, and each of the first transistor and the second transistor has a first threshold voltage or a second threshold voltage, wherein the second threshold voltage is greater than the first threshold voltage,
when the first transistor and the second transistor of one of the plurality of memory cells respectively have the first threshold voltage and the second threshold voltage, a corresponding bit corresponding to the one of the plurality of memory cells is of the bit value "0";
when the first transistor and the second transistor of the one of the plurality of memory cells respectively have the second threshold voltage and the first threshold voltage, the corresponding bit corresponding to the one of the plurality of memory cells is of the bit value "1";
when both the first transistor and the second transistor of the one of the plurality of memory cells have the second threshold voltage, the corresponding bit corresponding to the one of the plurality of memory cells is of the wildcard bit; and
when both the first transistor and the second transistor of the one of the plurality of memory cells have the first threshold voltage, the corresponding bit corresponding to the one of the plurality of memory cells is of the invalid bit.

7. The 3D memory array of claim 6, wherein the first transistor and the second transistor are configured to respectively receive a first driving voltage and a second driving voltage from a plurality of word lines, wherein the first driving voltage and the second driving voltage correspond to one of the plurality of bits of the searching input,
when the one of the plurality of bits of the searching input is of the bit value "0", the first driving voltage is greater than the second threshold voltage, and the second driving voltage is greater than the first threshold voltage and lower than the second threshold voltage;

when the one of the plurality of bits of the searching input is of the bit value "1", the first driving voltage is greater than the first threshold voltage and lower than the second threshold voltage, and the second driving voltage is greater than the second threshold voltage;

when the one of the plurality of bits of the searching input is of the wildcard bit, both the first driving voltage and the second driving voltage are greater than the first threshold voltage and lower than the second threshold voltage; and when the one of the plurality of bits of the searching input is of the invalid bit, both the first driving voltage and the second driving voltage are greater than the second threshold voltage.

8. A memory searching engine circuit, comprising:
a three-dimensional (3D) memory array, comprising a plurality of NOT-AND (NAND) strings, wherein each of the plurality of NAND strings is configured to store a storage data having a plurality of bits and receive a searching input having a plurality of bits;
a plurality of word lines, coupled to the plurality of NAND strings of the 3D memory array, and configured to transmit the searching input to the plurality of NAND strings; and
a sensing circuit, coupled to the 3D memory array, and configured to generate a searching result when receiving an output current,
wherein each of the plurality of bits of the storage data and the plurality of bits of the searching input is of a bit value "0", a bit value "1", a wildcard bit or an invalid bit,
wherein at least one of the plurality of bits of the storage data is configured as at least one data bit, at least one of the plurality of bits of the searching input is configured as at least one search bit, and all of the at least one data bit and the at least one search bit are of the bit value "0" or the bit value "1",
when the position of the at least one data bit in the storage data overlaps with the position of the at least one search bit in the searching input, at least one of the plurality of NAND strings that stores the storage data is turned off, and
when the position of the at least one data bit in the storage data does not overlap with the position of the at least one search bit in the searching input, the at least one of the plurality of NAND strings that stores the storage data generates the output current.

9. The memory searching engine circuit of claim 8, wherein at least consecutive two of the plurality of bits of the storage data are configured as at least two data bit; or
at least consecutive two of the plurality of bits of the searching input are configured as at least two search bit.

10. The memory searching engine circuit of claim 8, wherein all of the at least one data bit and the at least one search bit are of the bit value "0",
wherein at least one other of the plurality of bits of the storage data that does not belong to the at least one data bit is of the bit value "1", and
wherein at least one other of the plurality of bits of the searching input that does not belong to the at least one search bit is of the invalid bit.

11. The memory searching engine circuit of claim 8, wherein all of the at least one data bit and the at least one search bit are of the bit value "0",
wherein at least one other of the plurality of bits of the storage data that does not belong to the at least one data bit is of the invalid bit, and wherein at least one other of the plurality of bits of the searching input that does not belong to the at least one search bit is of the bit value "1".

12. The memory searching engine circuit of claim 8, wherein all of the at least one data bit and the at least one search bit are of the bit value "1",
wherein at least one other of the plurality of bits of the storage data that does not belong to the at least one data bit is of the bit value "0", and
wherein at least one other of the plurality of bits of the searching input that does not belong to the at least one search bit is of the invalid bit.

13. The memory searching engine circuit of claim 8, wherein all of the at least one data bit and the at least one search bit are of the bit value "1",
wherein at least one other of the plurality of bits of the storage data that does not belong to the at least one data bit is of the invalid bit, and
wherein at least one other of the plurality of bits of the searching input that does not belong to the at least one search bit is of the bit value "0".

14. The memory searching engine circuit of claim 8, wherein each of the plurality of NAND strings comprises a plurality of memory cells, and the plurality of memory cells are connected in series and respectively correspond to the plurality of bits of the storage data,
wherein each of the plurality of memory cells comprises a first transistor and a second transistor connected in series along a current direction of the output current, and each of the first transistor and the second transistor has a first threshold voltage or a second threshold voltage, wherein the second threshold voltage is greater than the first threshold voltage,
when the first transistor and the second transistor of one of the plurality of memory cells respectively have the first threshold voltage and the second threshold voltage, a corresponding bit corresponding to the one of the plurality of memory cells is of the bit value "0";
when the first transistor and the second transistor of the one of the plurality of memory cells respectively have the second threshold voltage and the first threshold voltage, the corresponding bit corresponding to the one of the plurality of memory cells is of the bit value "1";
when both the first transistor and the second transistor of the one of the plurality of memory cells have the second threshold voltage, the corresponding bit corresponding to the one of the plurality of memory cells is of the wildcard bit; and
when both the first transistor and the second transistor of the one of the plurality of memory cells have the first threshold voltage, the corresponding bit corresponding to the one of the plurality of memory cells is of the invalid bit.

15. The memory searching engine circuit of claim 14, wherein the first transistor and the second transistor are configured to respectively receive a first driving voltage and a second driving voltage from the plurality of word lines, wherein the first driving voltage and the second driving voltage correspond to one of the plurality of bits of the searching input,
when the one of the plurality of bits of the searching input is of the bit value "0", the first driving voltage is greater than the second threshold voltage, and the second driving voltage is greater than the first threshold voltage and lower than the second threshold voltage;
when the one of the plurality of bits of the searching input is of the bit value "1", the first driving voltage is greater than the first threshold voltage and lower than the second threshold voltage, and the second driving voltage is greater than the second threshold voltage;

when the one of the plurality of bits of the searching input is of the wildcard bit, both the first driving voltage and the second driving voltage are greater than the first threshold voltage and lower than the second threshold voltage; and when the one of the plurality of bits of the searching input is of the invalid bit, both the first driving voltage and the second driving voltage are greater than the second threshold voltage.

16. An encoding method suitable for a memory searching engine circuit, wherein the memory searching engine circuit comprises a plurality of NOT-AND (NAND) strings, the plurality of NAND strings is configured to receive a searching input having a plurality of bits, and the encoding method comprises:

storing, by each of the plurality of NAND strings, a storage data having a plurality of bits, wherein at least one of the plurality of bits of the storage data is configured as at least one data bit; and configuring, by the memory searching engine circuit, the plurality of bits of the searching input, wherein at least one of the plurality of bits of the searching input is configured as at least one search bit, wherein each of the plurality of bits of the storage data and the plurality of bits of the searching input is of a bit value "0", a bit value "1", a wildcard bit or an invalid bit, in response to the position of the at least one data bit in the storage data overlapping with the position of the at least one search bit in the searching input, at least one of the plurality of NAND strings that stores the storage data is turned off;

in response to the position of the at least one data bit in the storage data not overlapping with the position of the at least one search bit in the searching input, the at least one of the plurality of NAND strings that stores the storage data generates an output current.

17. The encoding method of claim 16, wherein storing, by each of the plurality of NAND strings, the storage data having the plurality of bits comprises:

configuring the at least one data bit as the bit value "0"; and configuring at least one other of the plurality of bits of the storage data that does not belong to the at least one data bit as the invalid bit, and configuring, by the memory searching engine circuit, the plurality of bits of the searching input comprises:

configuring the at least one search bit as the bit value "0"; and configuring at least one other of the plurality of bits of the searching input that does not belong to the at least one search bit as the bit value "1".

18. The encoding method of claim 16, wherein storing, by each of the plurality of NAND strings, the storage data having the plurality of bits comprises:

configuring the at least one data bit as the bit value "0"; and configuring at least one other of the plurality of bits of the storage data that does not belong to the at least one data bit as the bit value "1", and configuring, by the memory searching engine circuit, the plurality of bits of the searching input comprises:

configuring the at least one search bit as the bit value "0"; and configuring at least one other of the plurality of bits of the searching input that does not belong to the at least one search bit as the invalid bit.

19. The encoding method of claim 16, wherein storing, by each of the plurality of NAND strings, the storage data having the plurality of bits comprises:

configuring the at least one data bit as the bit value "1"; and configuring at least one other of the plurality of bits of the storage data that does not belong to the at least one data bit as the invalid bit, and configuring, by the memory searching engine circuit, the plurality of bits of the searching input comprises:

configuring the at least one search bit as the bit value "1"; and configuring at least one other of the plurality of bits of the searching input that does not belong to the at least one search bit as the bit value "0".

20. The encoding method of claim 16, wherein storing, by each of the plurality of NAND strings, the storage data having the plurality of bits comprises:

configuring the at least one data bit as the bit value "1"; and configuring at least one other of the plurality of bits of the storage data that does not belong to the at least one data bit as the bit value "0", and configuring, by the memory searching engine circuit, the plurality of bits of the searching input comprises:

configuring the at least one search bit as the bit value "1"; and configuring at least one other of the plurality of bits of the searching input that does not belong to the at least one search bit as the invalid bit.

* * * * *